United States Patent Office 2,718,463
Patented Sept. 20, 1955

2,718,463
SENSITIZED MAGNESIUM POWDER AND METHOD OF PRODUCING SAME

Richard G. Clarke, Suffield, Conn.

No Drawing. Application January 24, 1949,
Serial No. 72,555

13 Claims. (Cl. 52—24)

This invention relates to finely divided magnesium of increased inflammability, and a process for making it.

The product is useful in military and naval pyrotechnics, for example, a magnesium having the greatest sensitiveness to proper ignition and the highest combustion rate is desired.

One object of the invention is to provide finely divided magnesium having a burning rate considerably in excess of any heretofore known.

Another object is the provision of such a product which will also resist the deterioration action of moist air.

Another object is to provide a process of coating of the particles of finely divided magnesium with one substance from a group of substances which will preserve the magnesium until its fast-burning properties can be used, without substantially interfering with its light giving value or its fast-burning rate.

As a basic material suitable for treatment, I may use magnesium in powdered or flake form, or in the form of chips, cuttings or minute spheres, such as are produced by the process known as "atomization." This process melts the end of a magnesium wire and sprays the molten metal with a current of inert gas into an atmosphere of inert gas or into an oil bath. I prefer to use the magnesium in flake form as it comes into commerce for the use of plants manufacturing military pyrotechnics. Alloys of magnesium may also be used in the forms just enumerated. Such alloys must be readily combustible and must contain not less than 30 per cent magnesium by weight.

In order to make the new product, magnesium in powdered or flake form or in any of the forms just mentioned, or magnesium alloys, particularly those with aluminum, is brought into contact and ordinary temperatures with a dilute aqueous solution of ammonia (about ⅛ $NH_3$ by weight). This value corresponds to a specific gravity of about 0.9508 or 17.25 degrees Baumé. The period of contact should range between 30 to 90 seconds. The concentration given need only be approximate and may vary ±4 per cent from a median of 12.5 per cent by weight. The period of exposure may be slightly longer, but in no case should it be long enough for visible evolution of gas to occur.

After exposure to ammonia for such a time, the magnesium should be separated from the ammonia solution as rapidly as possible. Suitable ways of filtration by pressure or vacuum, or by centrifuging. The spent solution may be refortified with ammonia gas to its desired original value after a number of batches of metal have been treated, and fortified solution may be then reemployed. While I do not know the exact mechanism of the chemical change taking place during this step, I believe that the ammonia dissolves the extremely thin film of magnesium oxide which accumulates on the surface of the raw magnesium metal due to atmospheric oxidation.

The treated metal is then dried by being spread out in a thin layer on a chemically inert surface and then dried with warm dry air or with warm dry inert gases such as argon, helium, nitrogen or methane. The drying may be done in batches or continuously on a belt conveyer, in the known manner. The layer thickness should not exceed one inch and the temperature of the gas should not greatly exceed the boiling point of water. Generally temperatures ranging from 150° F. to 215° F. will be satisfactory.

The product, as so made will be subject to the deteriorating influence of moist air, but will be satisfactory for use in arid areas without any further treatment, except to package it in air-tight containers for transportation. Therefore, it may be considered as being one of the several final products of this invention.

In order to protect the metal particles to moderate degree against moisture, the dilute ammonia solution may be saturated or nearly saturated, say to an 80% degree before it contacts any hereto untreated magnesium with any one of a considerable variety of coating chemicals. The coating chemicals are preferably complex phenolic compounds which are classified by some authorities under the generic term "fuchsones." Of this group, examples are phenol-phthalein and aurin. Phenolic azo compounds may also be used, of which para-nitrobenzene-azo-ortho-cresol and para-nitrobenzene-azo-resorcinol are examples. Any phenolic fuchsone or azo compounds will be operative. Other phenolic azo compounds of the benzenoid type are, for example, the naphtholic azo derivatives. Examples of satisfactory naphtholic azo compounds are benzene-azo-beta-naphthol and para-nitrobenzene-azo-beta-naphthol. It is to be noted that these compounds may behave as if they had both benzenoid and quinoid configuration. The determining factor distinguishing between the benzenoid structures is drawn according to how the compounds react. In their reactions involving substitution of functional groups on the aromatic nucleus, they show quinoid behavior. In their reactions involving the functional groups alone, and possibly in reactions of addition to the aromatic nucleus, they show benzenoid behavior.

The steps in the coating method are exactly the same as when the ammonia solution alone is used, except that the coating agent is present from 89 per cent to 100 per cent of saturation in the same dilution of ammonium hydroxide as before. In such case, the step of treating with ammonium hydroxide alone may be dispensed with. In other words the oxide coating can be dissolved off the commercial material and a protective organic coating added by the action of the same bath which contains both ammonia and the coating chemical. The resulting thinly coated magnesium is moisture-resistant—not moisture-proof. Reasonable precautions against moisture still must be preserved, but hygroscopic deterioration is greatly lessened. The speed of combustion of the coated metal is not substantially lower than of similar uncoated metal.

The burning rate of the proved product is about 30 cm. per second in an open train lighted at one end and being under ordinary atmospheric pressure. Ordinarily magnesium of the same particle size burns only at about 1.2 cm. per second in a similar train. My uncoated product cannot be identified by any test with which I am familiar except by testing its burning rate under the conditions just mentioned. I am unable to prove that its oxide coating is reduced; the explanation advanced is still merely theoretical.

The term "magnesium" as used in the appended claims includes pure and commercial magnesium and also its combustible alloys with any other metal, provided the magnesium is present to a proportion not less than 30 per cent by weight.

I claim as my invention:

1. Magnesium particles in sufficiently finely divided condition as to be readily combustible in air at atmospheric pressure and temperature, each of said particles having been treated with dilute ammonium hydroxide of about 0.9508 sp. gr. for about 30 to 90 seconds followed by quick separation from the ammonium hydroxide and by drying at moderate temperatures.

2. Magnesium according to claim 1, which is coated with a thin coating of a fuchsone.

3. Magnesium, according to claim 1, which is coated with a thin coat of a complex phenolic substance selected from the group consisting of phenolphthalein, para-nitrobenzene-azo-ortho-cresol and para-nitrobenzene-azo-resorcinol.

4. Magnesium, according to claim 1, which is coated with a naphtholic azo compound.

5. Magnesium according to claim 1 which is coated with a naphtholic substance selected from the group consisting of para-nitrobenzene-azo-beta-naphthol and benzene-azo-beta-naphthol.

6. Magnesium, according to claim 1, which is coated with a thin coat of para-nitrobenzene-azo-resorcinol.

7. Magnesium in finely divided particle form, each particle being sensitized with dilute ammonium hydroxide solution to burn at a materially faster rate than untreated magnesium of similar particle size and shape under identical conditions, each particle also bearing a thin coating of a fuchsone having the ability to protect such sensitized magnesium against the deteriorating effects of moist air.

8. The process of treating magnesium in finely divided powder or flake form which comprises contacting the magnesium with ammonium hydroxide aqueous solution of which about one-eighth of its weight is $NH_3$, continuing the contact for about thirty to ninety seconds, separating the ammonium hydroxide and the magnesium as quickly as possible, and drying the magnesium in a layer not thicker than one inch at a temperature between 150° F. and 215° F., whereby the burning rate of the magnesium in open air will be substantially increased.

9. The process of treating finely divided magnesium in powder or flake form, which comprises contacting the magnesium with ammonium hydroxide aqueous solution of which about one-eighth of its weight is $NH_3$ and which is impregnated with a substantial amount of a chemical selected from the group consisting of phenolphthalein, para-nitro-benzene-azo-ortho-cresol and para-nitrobenzene-azo-resorcinol, continuing the contact for about thirty to ninety seconds, separating the ammonium hydroxide and the other chemical solution as quickly as possible from the magnesium, and drying the magnesium in the layer not thicker than one inch at a temperature between 150° F. and 250° F. whereby the burning rate of the magnesium in open air will be substantially increased and the magnesium will be made resistant to the deteriorating action of moist air.

10. The process of treating finely divided magnesium in powder or flake form which comprises contacting the magnesium with ammonium hydroxide aqueous solution of which about one-eighth of its weight is $NH_3$ and which is impregnated with a substantial amount of a fuchsone, continuing the contact for about thirty to ninety seconds, separating the ammonium hydroxide and the other chemical solution as quickly as possible from the magnesium, and drying the magnesium in the layer not thicker than one inch at a temperature between 150° F. and 250° F., whereby the burning rate of the magnesium in open air will be substantially increased and the magnesium will be made resistant to the deteriorating action of moist air.

11. The process according to claim 10 in which the chemical impregnating the ammonium hydroxide solution is a naphtholic azo compound.

12. Magnesium in finely divided particle form, each particle being sensitized with dilute ammonium hydroxide solution to burn at a materially faster rate than untreated magnesium of similar particle size and shape under identical conditions, each particle bearing a thin coat of phenolphthalein.

13. Magnesium in finely divided particle form, each particle being sensitized with dilute ammonium hydroxide solution to burn at a materially faster rate than untreated magnesium of similar size and shape under identical conditions, each particle bearing a thin coating of aurin.

No references cited.